United States Patent [19]
Fritsch et al.

[11] Patent Number: 5,372,491
[45] Date of Patent: Dec. 13, 1994

[54] DEVICE FOR MANUFACTURING PLASTIC MOLDINGS AND USE OF THE DEVICE

[75] Inventors: Walter Fritsch, Altbach; Manfred Huettner, Notzingen, both of Germany

[73] Assignee: Pebra GmbH Paul Braun, Esslingen, Germany

[21] Appl. No.: 135,134

[22] Filed: Oct. 12, 1993

Related U.S. Application Data

[63] Continuation of Ser. No. 466,447, filed as PCT/EP88/00982, Oct. 29, 1988, published as WO 89/04751, Jun. 1, 1989, abandoned.

[30] Foreign Application Priority Data

Nov. 19, 1987 [DE] Germany ............... 3739122

[51] Int. Cl.⁵ ............... B29C 45/13; B29C 45/33
[52] U.S. Cl. ............... 425/130; 425/4 R; 425/405.1; 425/417; 425/577; 264/328.7; 264/314
[58] Field of Search ............ 425/577, 135, 130, 405.1, 425/417, 4 R; 264/328.7, 328.12, 45.2, 314, 46.4, 328.6

[56] References Cited

U.S. PATENT DOCUMENTS

| | | | |
|---|---|---|---|
| 4,004,868 | 1/1977 | Ohdate | 425/130 |
| 4,157,883 | 6/1979 | Mares | 264/328.12 |
| 4,335,068 | 6/1982 | Hemery | 264/328.7 |
| 4,477,399 | 10/1984 | Tilton | 249/65 |
| 4,608,213 | 8/1986 | Kurumizawa et al. | 264/45.1 |
| 4,714,575 | 12/1987 | Preston | 264/46.4 |
| 4,755,411 | 7/1988 | Wing et al. | 264/45.1 |
| 4,873,044 | 10/1989 | Epel | 264/314 |
| 5,071,605 | 12/1991 | Kawaguchi et al. | 264/45.2 |

FOREIGN PATENT DOCUMENTS

| | | | |
|---|---|---|---|
| 4802023 | 7/1969 | Japan | 264/328.7 |
| 60-034812 | 2/1985 | Japan | 264/45.2 |
| 60-247520 | 12/1985 | Japan | 264/328.7 |
| 1177705 | 1/1970 | United Kingdom | 264/328.7 |

Primary Examiner—Allan R. Kuhns
Attorney, Agent, or Firm—Flynn, Thiel, Boutell & Tanis

[57] ABSTRACT

In a device for manufacturing composite plastic mouldings, at least two different reaction mixtures are injected simultaneously through different sprues (24,26) into the cavity (28,28',28") of a mould (20,22). During the injection time of at least one of the reaction mixture, the cavity is subdivided into two or more mutually isolated regions. Following the injection of one reaction mixture, the separation between the regions of the cavity is removed and the at least partially liquid reaction mixtures converge in the separation plane. This device makes possible to join at least two materials having different properties in a single operation. It is useful for manufacturing bumper bars, spoilers, coach-work, and internal linings of motor vehicles.

10 Claims, 5 Drawing Sheets

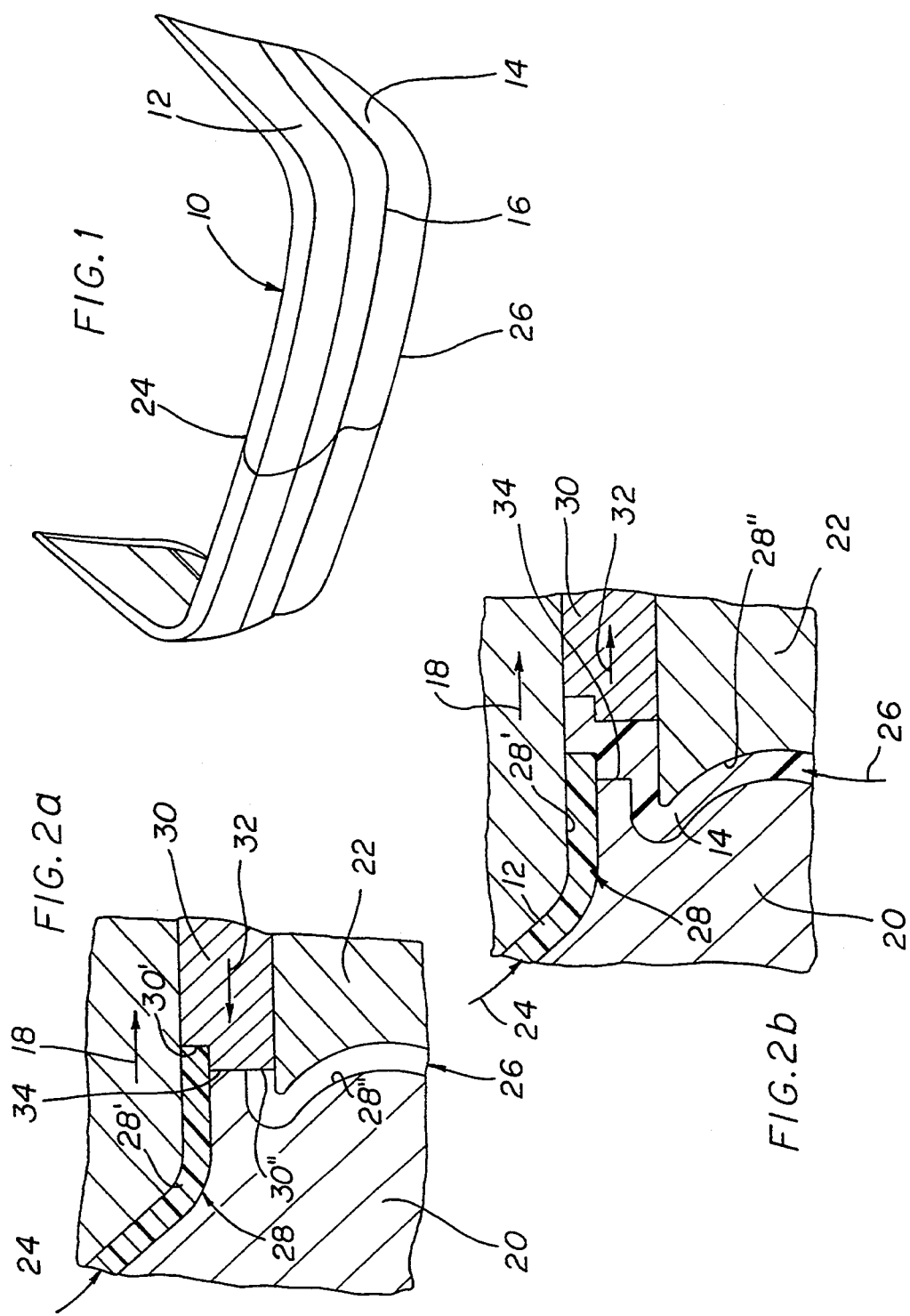

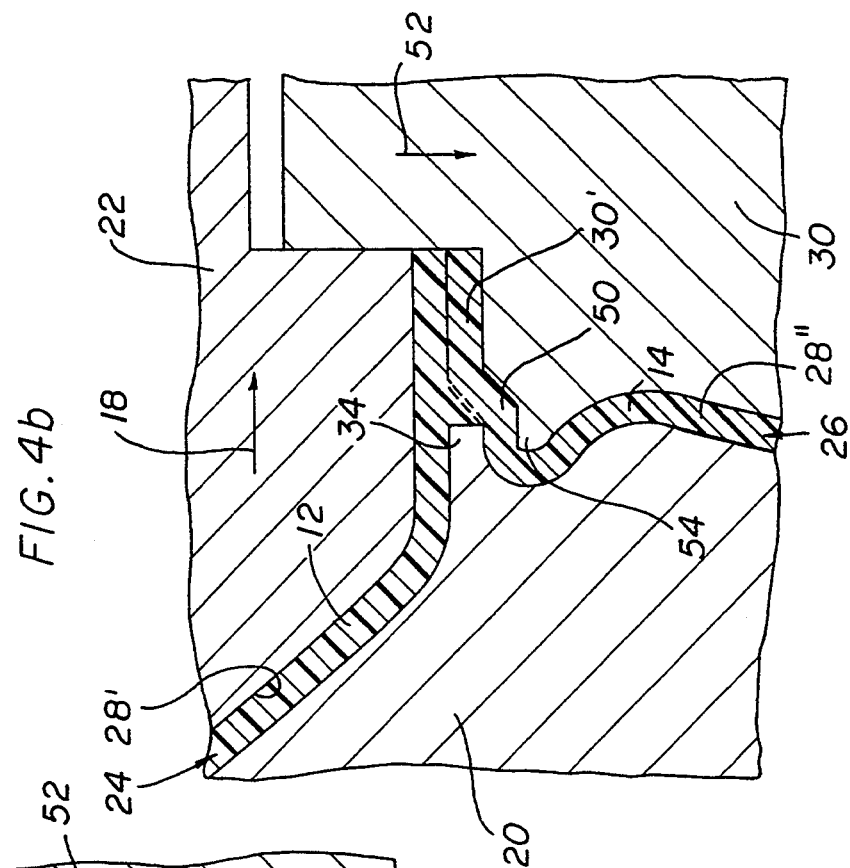
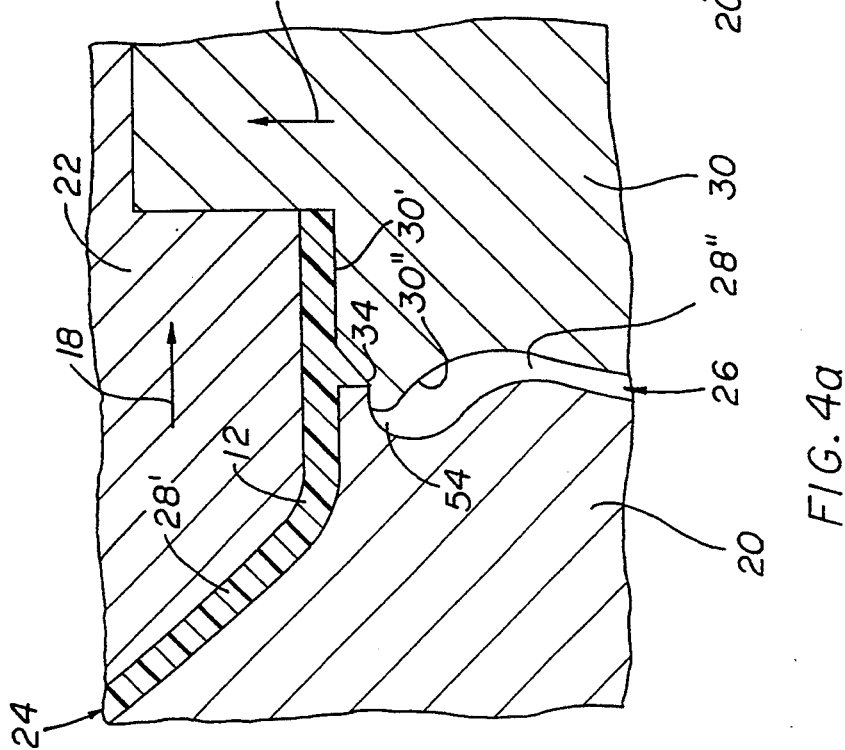

DEVICE FOR MANUFACTURING PLASTIC MOLDINGS AND USE OF THE DEVICE

This application is a continuation of U.S. Ser. No. 07/466 447, filed as PCT/EP88/00982, Oct. 29, 1988, published as WO89/04751, Jun. 1, 1989, now abandoned.

FIELD OF THE INVENTION

The invention relates to a device for the manufacture of plastic moldings, in which at least two reaction components can be mixed in a liquidy state, can be injected into a connected cavity of a mold and can there be hardened by a chemical reaction forming a molding.

BACKGROUND OF THE INVENTION

In the so-called reaction injection method, two reaction components which in the initial state are still liquidy in the initial state, like polyetherpolyol and polyisocianate, are conveyed by means of dosing pumps to a mixing head and are united to a reaction mixture. The reaction mixture flows from the mixing head through a sprue into the mold and reacts there in the cavity into a solid material, for example polyurethane.

It is known to inject or foam moldings of this type during their manufacture as reaction mixtures onto metallic or plastic surfaces in order to create a composite part in this manner. However, the adhesive connection mainly in the case of plastic-plastic composite parts leaves much to be desired. Aside from this, this type of manufacture requires expensive tools and separate operations during the manufacture of the two composite parts.

The basic purpose of the invention is to provide a device with which the plastic-plastic composite parts made out of reaction mixtures can be manufactured particularly easily and inexpensively in one operation.

The solution of the invention is based on the thought that composite parts of various plastics can be manufactured by injecting from various sprues at least two different reaction mixtures simultaneously or at different times into the cavity of a mold, by the cavity during the injection time of at least one of the reaction mixtures being separated into two or more mutually sealed regions and by cancelling the separation of the cavity regions following the injection time of the one reaction mixture and while at least partially still liquidy reaction mixtures cover the separation plane.

To achieve this at an optimum, the invention suggests the following characteristics:

The cavity can be loaded with different reaction mixtures through at least two sprues and be separated at least at one separation plane at times into mutually sealed regions connected each with one of the sprues;

in the mold in the region of the separation plane there is arranged
  (a) a separating slide member movable relative to the cavity or
  (b) a flexible separating seal movable under the action of a pressure medium;

The separating slide member or the separating seal has a blocking surface projecting on both sides over the separation plane toward the two adjacent cavity regions and forming at the projecting parts both in the blocking state and also in the opening state a boundary surface of the cavity in the adjacent cavity regions.

The flexible separating seal is advantageously constructed as a rubber-elastic tube arranged in an elongated open border recess and loadable with a pressure medium (pressurized air or hydraulic fluid), a side of which tube, which side lies opposite the border opening, is fastened in the recess on the mold and can be pressed with its end face, which is on the side of the opening, against a separating edge arranged on the oppositely lying mold part thus separating two cavity regions, and which end face can be lifted off from same opening a gap. The width of the gap and thus the wall thickness of the molding in the transition region can be adjusted by selecting the injection internal pressure. The sealing tube is advantageously, bellows-like, expandable and compressible in the recess.

The separating seal has the advantage, compared with a separating slide member movable transversely with respect to the cavity, that it can be utilized also for rounded forms, thus not only in flat separation planes, since it carries out an all over equal path of movement during a change of the internal pressure, but also in angled regions and regions curved relative to one another. Also the mold does not need any additional movable parts which must be separately guided and tempered as this is the case with a separating slide member.

Whereas if inner slide members are needed in a curved region of a mold, the aforedescribed separating slide members and separating seals with a path of movement extending transversely with respect to the cavity are not suited for the temporary separation of the cavity regions. However, separating slide members which can be moved transversely with respect to the opening direction of the mold can here be used advantageously.

Such a separating slide member has advantageously a sealing edge which can be pressed sealingly against a separating edge of the oppositely lying mold part, which separating edge is aligned in opening direction of the mold. Following the sealing edge, the separating slide member has on the one side a boundary wall for the cavity, which boundary wall is aligned substantially perpendicularly with respect to the direction of movement of the separating slide member and borders an overlapping region between the reaction mixtures in two end positions, while the separating slide member has on the other side a cavity boundary wall forming the inside contour of the molding in the opening position of the separating slide member.

According to a further advantageous development of the invention, two spaced apart cavity regions loadable with different reaction mixtures are provided, which cavity regions on its sides facing one another are separated by spaced apart separating edges from a third cavity region loadable with a further reaction mixture. Either a joint separating slide member defining third cavity region or two separating slide members or separating seals, which are independent from one another, can be pressed against the separating edges.

To achieve decorative surfaces, it is possible to insert into one of the cavity regions a foil or fabric blank, which can be foamed from behind by the reaction mixture. The foil or the fabric blank can thereby be clamped in two parts at the separating edge between two molding regions by the separating slide member or the separating seal, with the edge of the blank being able to project beyond the separating edge into the adjacent cavity region and with the respective reaction mixture foaming there around the edge. Panelling parts, for example for interior panellings of doors of motor vehicles which must be divided into multi-colored or differently soft regions, which in turn, if necessary, can be lined with a foil or a textile surface, are preferably manufactured in this manner.

To adjust an optimum connection between the composite parts, the time-sequence control has proven to be advantageous, with which, in accordance with the different injection, start of increasing viscosity and hardening times of the reaction mixtures staggered in time, the various sprues are loaded with the reaction mixtures and the separating slide member or rather the separating seal is controlled.

The device of the invention can be utilized advantageously for the manufacture of bumpers for motor vehicles out of Hard-Pur in composite action with a spoiler of Soft-Pur, which spoiler is near the ground, with the soft lip being able to yield elastically and therefore be free of destruction by possible obstacles, as for example a curb.

A further possibility for use consists in the manufacture of air-inlet screens, panelling parts and body parts for motor vehicles of hard plastic, which in their edge areas are defined by a soft composite lip. Such a lip guarantees on the one hand a tolerance compensation with respect to the adjoining parts and fulfills on the other hand a gap-filling sealing function.

BRIEF DESCRIPTION OF THE DRAWINGS

The invention will be described in greater detail hereinafter in connection with the exemplary embodiments schematically illustrated in the drawings, in which:

FIG. 1 is a diagrammatic view of a bumper constructed as a composite part;

FIG. 2a and FIG. 2b illustrate a portion of a mold with the separating slide member for the manufacture of the molding according to FIG. 1 during two different operating conditions;

FIG. 4a and FIG. 4b illustrate a portion of a mold with a contour-forming separating slide member for the manufacture of the molding according to FIG. 1 in two different operating conditions;

DETAILED DESCRIPTION

Figure 3B:
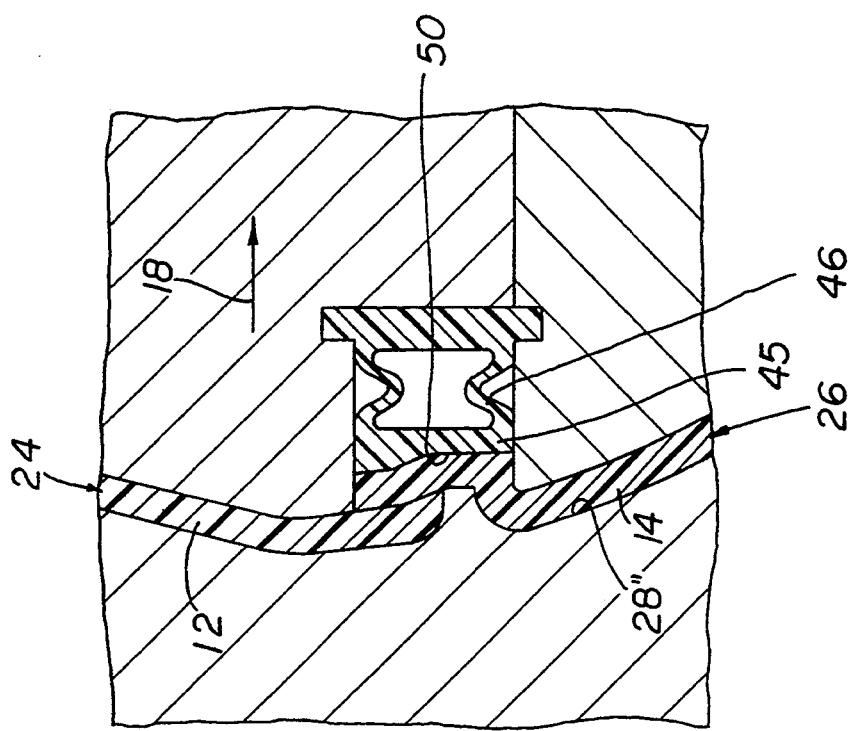
FIG. 3a and FIG. 3b illustrate a portion of a mold with the separating seal for the manufacture of the molding according to FIG. 1 in two different operating conditions.

The molding 10 shown in FIG. 1 is a bumper for motor vehicles which, in the upper part 12, consists of a hard plastic and in its lower part 14 close to the ground of a soft plastic. The two parts 12 and 14 preferably consisting of polyurethane are connected in one piece at the separating line 16. Reference numerals 24, 26 characterize the two sprues of the molding regions 12, 14.

The mold for the manufacture of the molding 10, of which mold portions are shown in FIGS. 2a and 2b, consists substantially of two mold parts 20, 22 movable against one another in direction of the arrow 18. The mold parts define a cavity 28 which is loaded through two different sprues 24, 26 with a reaction mixture in a liquid state consisting of two reaction components like polyetherpolyol and polyisocyanate. Furthermore, a separating slide member 30 is movably arranged in the mold part 22 for movement in the direction of the arrow 32. The separating slide member 30 separates the regions 28' and 28" of the cavity 28 at the separating plane 34 in the position according to FIG. 2a and connects them in the position according to FIG. 2b. The separating slide member 30 has a blocking surface 30', 30" overlapping the separation plane 34 in the cavity 28 on both sides. The blocking surface forms at the same time a boundary surface of the cavity.

At the start of the molding operation the sprue 24 is first loaded with the reaction mixture with the separating slide member 30 being closed (FIG. 2a). The region 28' of the cavity 28 is thereby first filled with the harder reaction mixture forming the upper part 12 of the molding 10. Following this injection the separating slide member 30 is, preferably while the reaction mixture forming the upper part 12 of the molding 10 is increasing in viscosity, moved into the position shown in FIG. 2b and the sprue 26 is, before, simultaneously or after the movement of the separating slide member 30, loaded with the softer reaction mixture for the lower part 14 of the molding 10. The cavity region 28" in the mold is thereby filled with the reaction mixture. The still liquidy reaction mixture in the region 28" meets in the separation plane 34 the already reacting reaction mixture in the region 28', which, however, is still sufficiently liquidy at its surface and intimately combines with the mixture in the region 28" during the subsequent joint hardening.

Figure 3A:
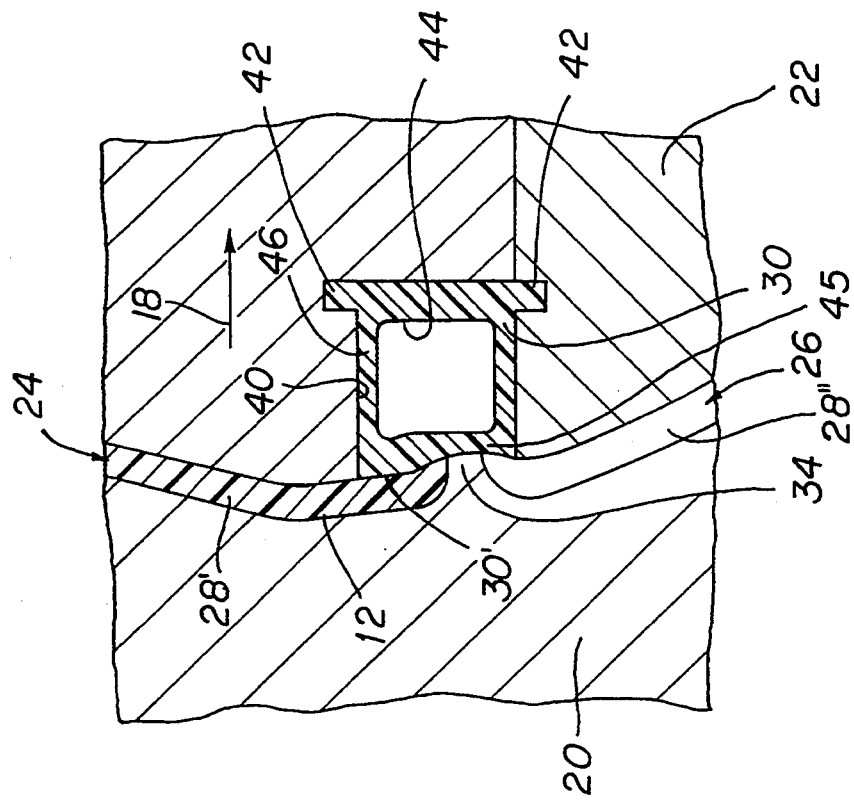

The exemplary embodiment shown in FIGS. 3a and 3b has in the mold 22, in place of the separating slide member 30, a separating seal 30 designed as an elastic rubber tube arranged in a recess 40 of the mold 22, which recess 40 has an open border opening toward the cavity. The sealing tube has laterally projecting shoulders 42 in the rearward region, with which shoulders it is fixed against movement in corresponding undercut areas of the recess 40. The cavity 44 of the sealing tube 30 can be loaded with a pressure medium, for example with pressurized air or hydraulic fluid and can thus be adjusted in position at its free end face 45 through the bellows-like sidewalls 46. In the closed position shown in FIG. 3a, the end face 45 is pressed against a separating edge 34 of the mold 20, so that the cavity regions 28' and 28" are separated from one another. If reaction mixture is now injected through the sprue 24, the cavity region 28' with the region near the separating plane being limited on the one side by a part 30' of the end face 45 fills up first. Following this injection, and preferably while the reaction mixture forming of the upper part 12 of the molding 10 in increasing in viscosity, the internal pressure of the separating seal 40 is reduced such that its end face 45 moves from the position shown in FIG. 3a into the position shown in FIG. 3b leaving a gap 50. If the sprue 26 is loaded with reaction mixture, then the cavity region 28" fills up. Furthermore, the still liquidy reaction mixture forming the lower part 14 of the molding 10 meets in the separating plane 34 the already reacting reaction mixture forming the upper part 12 and combines with same during the subsequent joint hardening.

The exemplary embodiment illustrated in FIGS. 4a and 4b shows a contour-forming separating slide member 30, which is arranged in the mold 22 and which can be moved in direction of the arrow 52 transversely with respect to the mold opening direction 18. The separating slide member 30 has a separating edge 54, which in the closing position shown in FIG. 4a abuts a separating web 34 of the mold 20. This separates the cavity regions 28' and 28" so that during loading of the sprue 24, first only the cavity region 28' is filled with the reaction mixture forming the upper part 12. The cavity region 28' is defined near the separating web 34 by a relatively wide boundary surface 56 of the separating slide member 30. If the separating slide member 30 is now moved from the position according to FIG. 4a in direction of the arrow 52 into the position according to FIG. 4b, then a gap 50 opens up between the separating edges 34 and 54, through which gap during the subsequent filling of the cavity region 28", reaction mixture penetrates into the overlapping region bordered by the boundary surface 30' between the two cavity regions. The cavity region 28" assumes its final shape only after movement of the separating slide member 30 in the area of the boundary surface 30". The mold 22 together with the separating slide member 30 is after hardening lifted in direction of the arrow 18 off from the mold 20. The hardened molding 12, 14 is thus exposed and can be removed from the mold.

Figure 5:
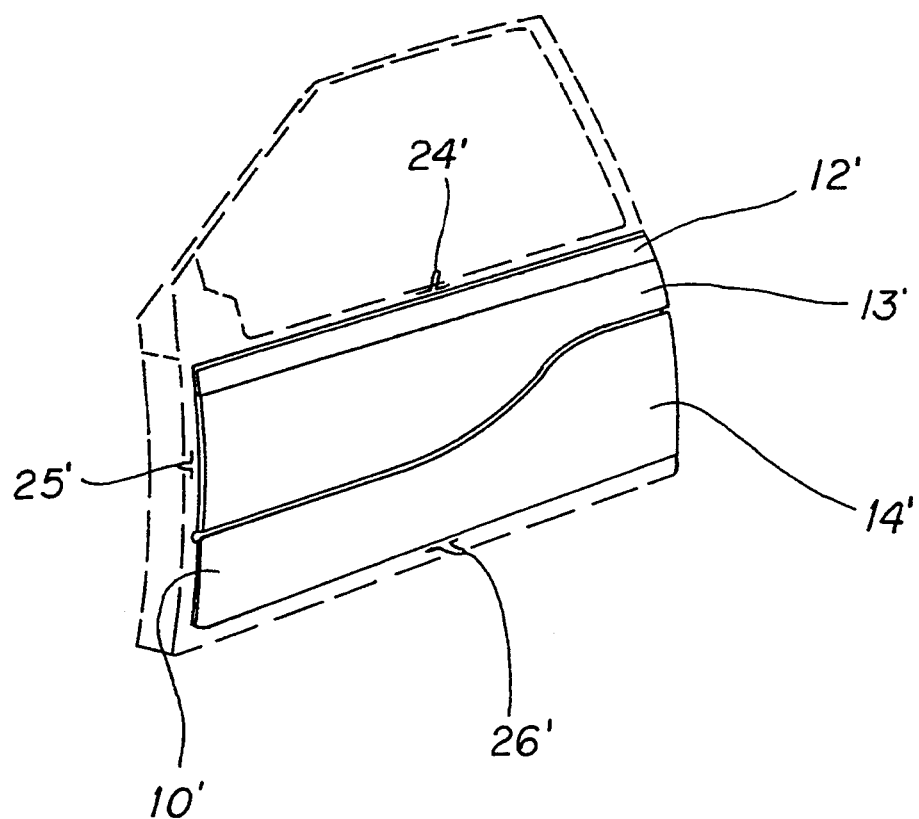
FIG. 5 is a diagrammatic view of an interior panelling of a car door, which interior panelling is constructed as a composite part.

The molding 10' illustrated in FIG. 5 is an interior door panelling for a motor vehicle consisting of three integrally connected, differently colored, parts 12', 13' and 14' and, if necessary, differently hard polyurethane. The sprues of the three molding regions are identified by the reference numerals 24', 25' and 26'.

Figures 6A, 6B:
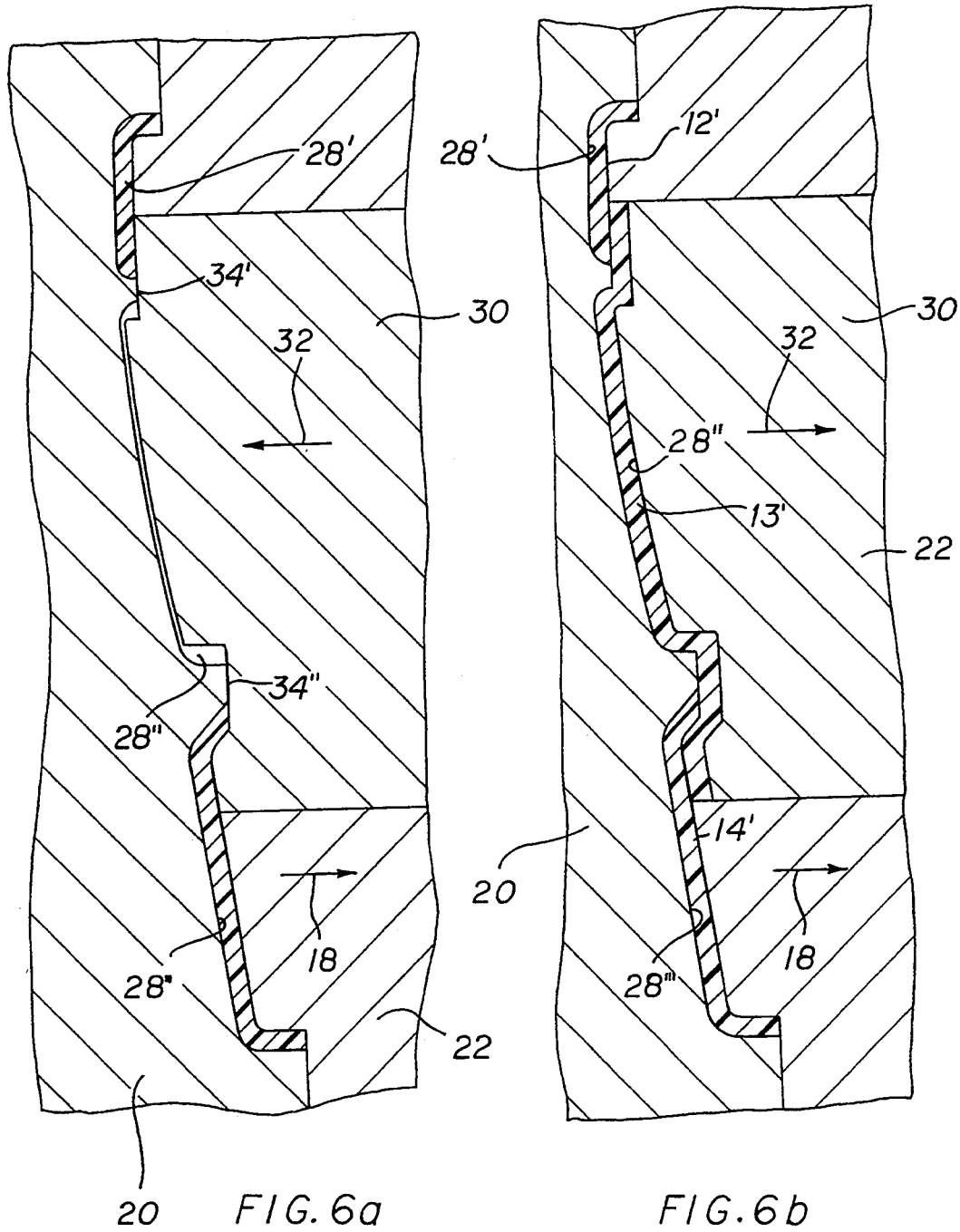
FIG. 6a and FIG. 6b illustrate a portion of a mold with the separating slide member for the manufacture of the molding according to FIG. 5 in two different operating conditions.

The mold for the manufacture of the molding 10', which mold is partly shown in FIGS. 6a and 6b, consists substantially of two mold parts 20, 22 movable toward one another in direction of the arrow 18. The mold parts 20, 22 define a cavity, which is loaded through the three sprues 24', 25', 26' with a reaction mixture in a liquid state. A separating slide member 30 is arranged movably in direction of the arrow 32 in the mold 22. The separating slide member separates the regions 28', 28" and 28" of the cavity at the separating planes 34' and 34" in the position according to FIG. 6a and connects them in the position according to FIG. 6b. The separating slide member 30 bridges the separation planes 34', 34" and defines in this manner the center area 28" of the three-part cavity.

At the start of the molding operation, with the separating slide member 30 closed, the sprues 24' and 26' are first loaded each with a reaction mixture (FIG. 6a). The regions 28' and 28" of the cavity are thereby filled with the reaction mixtures forming the upper part 12' and the lower part 14' of the molding 10'. The separating slide member 30 is thereafter, and while the reaction mixtures forming the parts 12' and 14' of the molding 10' are increasing in viscosity, moved into the position illustrated in FIG. 6b and the sprue 25' is loaded with the reaction mixture for the center part 13' of the molding. The cavity region 28" is thereby filled with the reaction mixture. The still liquidy reaction mixture 13' meets in the separation planes 34' and 34" the already reacting reaction mixtures for the parts 12' and 14', which are, however, still sufficiently liquidy at their surface, and joins same during the subsequent joint hardening.

The embodiments of the invention in which an exclusive property or privilege is claimed are defined as follows:

1. A device for the manufacture of a plastic molding, comprising:
    at least a pair of mold members supported for movement in an opening direction away from one another and a closing direction toward one another and which, when closed, define a mold cavity therebetween, said mold cavity including a separating wall dividing said mold cavity into a pair of mutually adjacent regions;
    a separation slide means supported for movement with one of said mold members and with respect thereto and into sealing engagement with said separating wall in a first position thereof and out of engagement with said separating wall in a second position thereof, said mold cavity being divided, when in said first position, into at least a pair of mutually adjacent and sealed regions, said separation slide means being movable to said second position and in a direction transversely to the opening and closing direction of the mold members to facilitate a connecting of said adjacent regions together;
    at least two sprues, a first one of said sprues effecting a separate feeding of a first synthetic resin component to a first of said pair of mutually adjacent regions and only in response to said separation slide means being in said first position, a second one of said sprues effecting a separate feeding of a second synthetic resin component, compatible with said first synthetic resin component but having a different property, to a second of said sealed regions, said first and second synthetic resin components joining together in a void created by said separation slide means being moved from said first position to said second position, said separation slide means including surface means thereon forming a first boundary wall surface in said mold cavity and a blocking surface, said blocking surface on said separating slide means, when in said first position, sealingly engaging said separating wall on an oppositely lying mold member, said separating wall extending from the oppositely lying mold member in a direction aligned with the opening and closing directions of the mold, said separating edge further having on one side of the engaged separating wall and blocking surface a second boundary wall surface aligned substantially perpendicularly with respect to the direction of movement of said separating slide means and, on the other side of the engaged separating edge and blocking surface, a cavity formed in part by said first boundary wall surface on a segment of said separating slide means, said first boundary wall being aligned substantially parallel to the direction of movement of said separating slide means so that upon a start of increasing viscosity of said first synthetic resin component followed thereafter by the separate feeding of the second synthetic resin with said separation slide means in said second position, the plastic molding will include an integration of the synthetic resin components with differing properties at the juncture between said first and second synthetic resin components and in said void.

2. The device according to claim 1, wherein said surface means on said separating slide means includes surface-enlarging structure.

3. The device according to claim 1, wherein said blocking surface is movable parallel with respect to a mold separation plane.

4. The device according to claim 1, wherein said elastic material is an elastic rubber material.

5. The device according to claim 4, wherein said tube is bellows-like.

6. The device according to claim 4, wherein a width of said void is adjustable by selecting the internal fluid pressure in said tube.

7. The device according to claim 1, wherein a foil blank or a fabric blank is placed into one of the adjacent regions and the synthetic resin component filled therein can foam behind said blank.

8. The device according to claim 7, wherein the foil or fabric blank is clamped temporarily between said separation slide means and said separating edge.

9. The device according to claim 8, wherein an edge of the foil or fabric blank projects beyond said separating wall into an adjacent region and the respective synthetic resin component foams there around the edge.

10. A device for the manufacture of a plastic molding, comprising:
- at least a pair of openable and closable mold members which when closed define a mold cavity therebetween, said mold cavity including a separating wall dividing said mold cavity into a pair of mutually adjacent regions;
- a separation slide means supported for movement with one of said mold members into sealed engagement with said separating wall in a first position thereof and out of engagement with said separating wall in a second position thereof, said mold cavity being divided, when in said first position, into at least a pair of mutually adjacent and sealed regions and, when in said second position, connecting said adjacent regions together;
- at least two sprues, a first one of said sprues effecting a separate feeding of a first synthetic resin component to a first of said pair of mutually adjacent regions and only in response to said separation slide means being in said first position, a second one of said sprues effecting a separate feeding of a second synthetic resin component, compatible with said first synthetic resin component but having a different property, to second of said pair of said adjacent regions, said first and second synthetic resin components joining together in a void created by said separation slide means being moved to said second position;
- said separation slide means including surface means thereon forming a boundary wall surface in said mold cavity and a blocking surface, said boundary wall surface projecting beyond both sides of said separating wall in said first position of said separation slide means, said separation slide means further being defined by a hollow tube of an elastic material, said tube being fixedly arranged in an elongated open recess in said mold cavity and on one of said pair of mold members, an interior of said hollow tube being loaded with pressurized air or hydraulic fluid so as to cause, when pressurized, said blocking surface to be pressed to said first position against said separating wall arranged on an oppositely lying mold part to sealingly separate said mutually adjacent regions from one another and to facilitate a filling of one of said pair of adjacent regions with said first synthetic resin component, and to cause, when depressurized, said blocking surface to be lifted off from said separating wall to said second position to thereby open said void between the regions upon a start of increasing viscosity of said first synthetic resin component and facilitating a filling of the other of said pair of adjacent regions and said void with said second synthetic resin component, the plastic molding including an integration of the synthetic resin components with differing properties at the juncture between said first and second synthetic resin components and in said void.

* * * * *